United States Patent
Park et al.

(10) Patent No.: US 7,084,544 B2
(45) Date of Patent: Aug. 1, 2006

(54) BRUSHLESS DC MOTOR

(75) Inventors: Jin Ho Park, Seoul (KR); Sun Ki Hong, Cheonan (KR)

(73) Assignee: Hyundai Motor Company and Kia Motors Corporation, Seoul (KR)

( * ) Notice: Subject to any disclaimer, the term of this patent is extended or adjusted under 35 U.S.C. 154(b) by 0 days.

(21) Appl. No.: 11/001,604

(22) Filed: Dec. 1, 2004

(65) Prior Publication Data

US 2005/0140243 A1    Jun. 30, 2005

(30) Foreign Application Priority Data

Dec. 30, 2003    (KR) ............... 10-2003-0100903

(51) Int. Cl.
*H02K 1/12*    (2006.01)
(52) U.S. Cl. .................. 310/216; 310/218
(58) Field of Classification Search ........... 310/216, 310/218, 254, 184, 185, 43, 194
See application file for complete search history.

(56) References Cited

U.S. PATENT DOCUMENTS

| | | | |
|---|---|---|---|
| 4,174,485 A * | 11/1979 | Soden et al. ............ | 310/89 |
| 4,818,905 A * | 4/1989 | Lender ................... | 310/42 |
| 4,942,325 A * | 7/1990 | Fukaya .................. | 310/257 |
| 5,013,953 A * | 5/1991 | Odell .................... | 310/254 |
| 5,049,770 A * | 9/1991 | Gaeth et al. ............ | 310/89 |
| 6,140,736 A * | 10/2000 | Hsu ..................... | 310/261 |
| 6,396,188 B1 * | 5/2002 | Kliman et al. .......... | 310/217 |
| 6,822,364 B1 * | 11/2004 | Suzuki et al. .......... | 310/218 |

FOREIGN PATENT DOCUMENTS

JP    2003-009491    10/2003

* cited by examiner

*Primary Examiner*—Tran Nguyen
(74) *Attorney, Agent, or Firm*—Morgan Lewis & Bockius LLP

(57) ABSTRACT

Assembly quality of an armature coil is significantly enhanced since a BLDC motor is provided with a rotor having a permanent magnet and a rotor core, for forming a magnetic field; a stator having an armature coil and an armature yoke, for forming a rotating magnetic field; and an assembly member of a ring type coaxially provided to the armature yoke, and having a plurality of projections formed at an inner circumference thereof with a predetermined distance therebetween.

2 Claims, 5 Drawing Sheets

BRUSHLESS DC MOTOR

CROSS-REFERENCE TO RELATED APPLICATIONS

This application claims priority of Korean Application No. 10-2003-0100903, filed Dec. 30, 2003, the disclosure of which is incorporated herein by reference.

FIELD OF THE INVENTION

The present invention relates to a direct current (DC) motor, and more particularly, to a brushless DC motor.

BACKGROUND OF THE INVENTION

In general, there are several kinds of DC motors. Among them, a brushless DC (BLDC) motor forms a magnetic field of a predetermined size and direction to rotate a rotor.

As shown in FIG. 1, a conventional BLDC motor is provided with a rotor R, a stator S, and an air gap 15. The rotor R is provided with a permanent magnet 11 and a rotor core 12. The stator S forms a rotating magnetic field in order to develop a desired speed and torque, and is provided with armature coils 13 and an armature yoke 14. The air gap 15 is located between the stator S and the rotor R, and it changes electrical energy into kinetic energy and delivers the kinetic energy.

Moreover, as shown in FIG. 2, the conventional BLDC motor is provided with a hall sensor 17. The hall sensor 17 senses a relative location of the permanent magnet 11 with respect to each of armature coils 13. Accordingly, since the stator S has an appropriate amount of electricity input thereto, a high torque which can be controlled is produced from the stator S.

A conventional BLDC motor as described above is assembled as follows.

For assembly of the stator, an armature yoke 14 and an armature coil 13 are prepared. In particular, an armature yoke 14 formed of ferromagnetic materials may be prepared as a block or pile type. A nonconductor 16 is located between the armature yoke 14 and the armature coils 13. The armature coils 13 are bonded to the nonconductor 16 by an adhesive material such that the armature coils 13 are arranged with predetermined gaps therebetween (as an example, equal gaps). The armature coils 13 are assembled with the armature yoke 14, and then the stator S is molded with an epoxy so as to enhance weatherproof properties thereof.

For assembly of the rotor, a permanent magnet 11 and a rotor core 12 are arranged together. In particular, the permanent magnet 11 is arranged as a segmented or ring shape, for example. An inner circumference of the permanent magnet 11 and an outer circumference of the rotor core 12 are bonded to each other with an adhesive material.

A hall sensor 17 is assembled on a PCB (printed circuit board) formed with a pattern which is predetermined on the basis of a constant of a stator and a magnetic pole number of a rotor. Such hall sensor 17 is assembled on/at the stator S with an adhesive material or a bolt, for example.

However, conventional BLDC motors as described above have certain problems. For example, assembly of the armature coils 13 is the most important determinant of efficiency of a BLDC motor. That is, when the distance between the armature coils 13 is fixed, the assembly is deemed to be perfect. However, according to the conventional BLDC motor, the distance between armature coils 13 is not fixed. Consequently, the conventional BLDC motor has a problem in that a torque ripple phenomenon is manifested due to an unequal rotating magnetic field. That is, vibration and/or noise occur, or efficiency of the BLDC motor is deteriorated.

In addition, since the distance between the armature coils 13 is not fixed, the conventional BLDC motor has a problem in that a weak part is present after the stator S is molded by an epoxy. Consequently, because of insulation failure at the weak part, a shorting phenomenon of armature coils occurs.

In addition, because assembly quality of the armature coils 13 is dependent on worker proficiency, the conventional BLDC motor has a problem in that productivity is deteriorated and inferior goods are mass-produced.

The information disclosed in this Background of the Invention section is only for enhancement of understanding of the background of the invention and should not be taken as an acknowledgement or any form of suggestion that this information forms the prior art that is already known in this country to a person of ordinary skill in the art.

SUMMARY OF THE INVENTION

An exemplary brushless DC (BLDC) motor according to an embodiment of the present invention includes a rotor having a permanent magnet and a rotor core. A stator having armature coils and an armature yoke forms a rotating magnetic field. At least one assembly member with a ring shape is coaxially provided on the armature yoke. The assembly member comprises a plurality of projections formed on an inner circumference thereof and with a predetermined distance therebetween.

In a further embodiment, the at least one assembly member comprises a first assembly member provided at a top end of the armature yoke and a second assembly member provided at a bottom end of the armature yoke.

It is preferable that the assembly member and the armature yoke be coupled by a coupling unit.

It is also preferable that the coupling unit includes a male portion formed at the assembly member and a female portion formed at the armature yoke.

It is preferable that the first and second assembly members are formed of an insulating material.

It is also preferable that the first and second assembly members are formed of resin and are molded by an injection molding process.

In another further embodiment, the at least one assembly member includes an assembly member provided along the entire inner circumference of the armature yoke, and the projections are formed at the inner circumference of the assembly member from the top portion to the bottom portion of the assembly member. It is also preferable that the assembly member in this embodiment is formed of resin and is molded on the armature yoke by a double-shot molding process.

In yet another further embodiment, the assembly member includes an upper assembly member and a lower assembly member. The upper assembly member is provided to a top end of the armature yoke such that a bottom portion thereof is inserted into an inner circumference of the armature yoke. The lower assembly member is provided to a bottom end of the armature yoke such that a top portion thereof is inserted into an inner circumference of the armature yoke. It is preferable that the BLDC motor includes a positioning unit such that projections of the upper assembly member are each positioned in correspondence to projections of the lower assembly member. It is also preferable that the positioning unit includes catch projections each formed at the upper and lower assembly members and catch grooves formed at the armature yoke in correspondence to the catch projections.

In a further alternative embodiment of the present invention, at least one assembly member is disposed within at least a portion a cylindrical armature yoke and extends around at least one end of the yoke. The assembly member is generally cylindrical in shape and has a plurality of projections spaced apart at predetermined intervals around its cylindrical inner circumference. The armature coils of the stator are spaced apart at the same predetermined intervals by the projections.

In a preferred alternative embodiment, the at least one assembly member comprises first and second assembly members, one disposed at each end of the armature yoke. Preferably, the first and second assembly members are separately secured along an outer surface of the armature yoke and corresponding projections of the assembly members are aligned via such securement. In another preferred alternative embodiment, the at least one assembly member comprises a single piece extending through the armature yoke and around at least a portion of each end. In this embodiment, the projections extend for substantially the entire length of the armature yoke and preferably the assembly member is made of an insulating material molded inside the armature yoke.

BRIEF DESCRIPTION OF THE DRAWINGS

The accompanying drawings, which are incorporated in and constitute a part of the specification, illustrate an embodiment of the invention, and, together with the description, serve to explain the principles of the invention.

DETAILED DESCRIPTION OF THE PREFERRED EMBODIMENTS

An embodiment of the present invention will hereinafter be described in detail with reference to the accompanying drawings.

In the description, components identical to the aforementioned related art will be given the same reference symbols, and explanations thereof will be omitted in explanation of the present invention.

Figure 3:
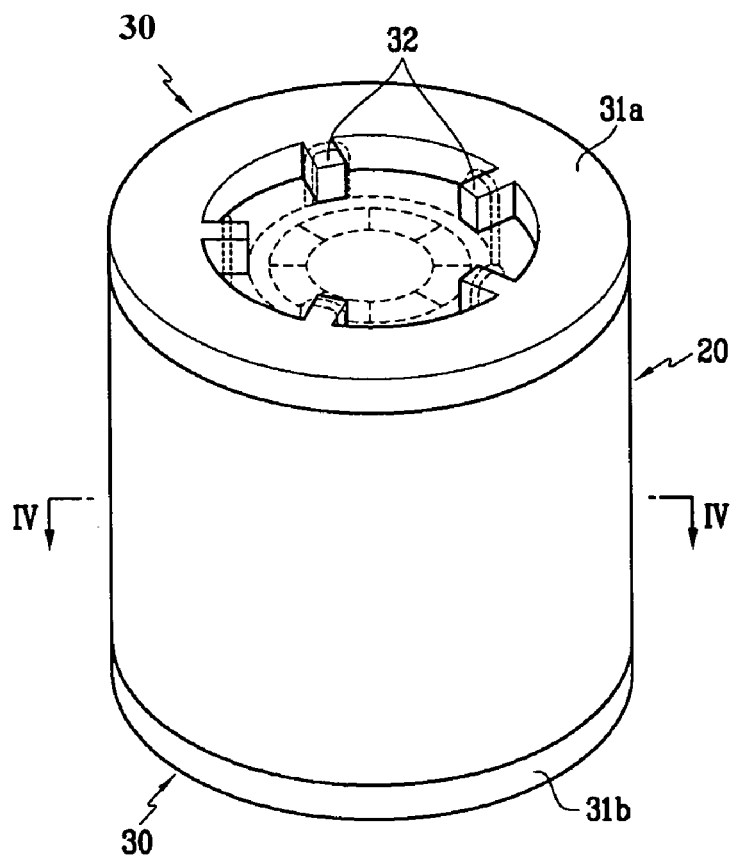
FIG. 3 is a perspective view of a BLDC motor according to a first embodiment of the present invention.
Figure 4:
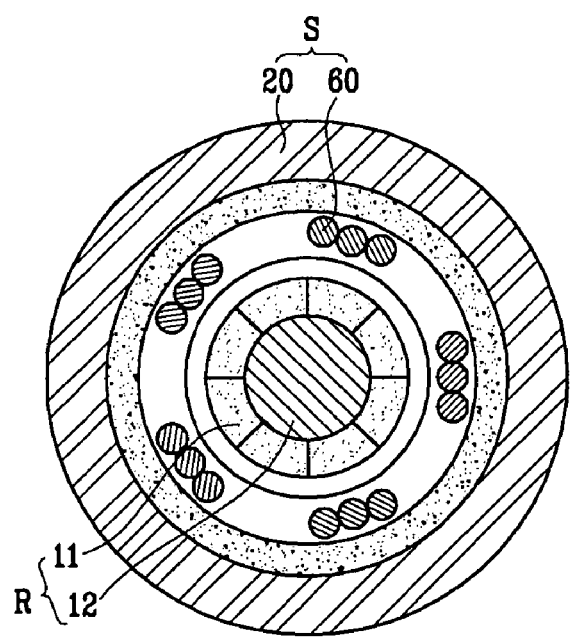
FIG. 4 is a cross-sectional view of the line □—□ in FIG. 3.

As shown in FIGS. 3 and 4, a BLDC motor according to a first embodiment of the present invention includes a rotor R, a stator S, and at least one assembly member 30. The rotor R is provided with a permanent magnet 11 and a rotor core 12, for forming a magnetic field. The stator S is provided with an armature coil 60 and an armature yoke 20, for forming a rotating magnetic field. The assembly member 30 has a ring shape and is coaxially provided to the armature yoke 20, and has a plurality of projections 32 formed at an inner circumference thereof and with predetermined distance therebetween.

As shown in FIG. 3, the at least one assembly member preferably comprises a first assembly member 31a and a second assembly member 31b. The first assembly member 31a is positioned at a top end of the armature yoke 20, and has a plurality of first projections 32 formed at an inner circumference thereof. The second assembly member 31b is positioned at a bottom end of the armature yoke 20, and has a plurality of second projections (not shown) formed at an inner circumference thereof in correspondence with the first projections 32. Accordingly, a distance between the armature coils 60 can be predetermined and fixed, since the first projections 32 and the second projections (not shown) are each positioned at a bottom end of the armature yoke 20 in correspondence to each other.

Figure 5:
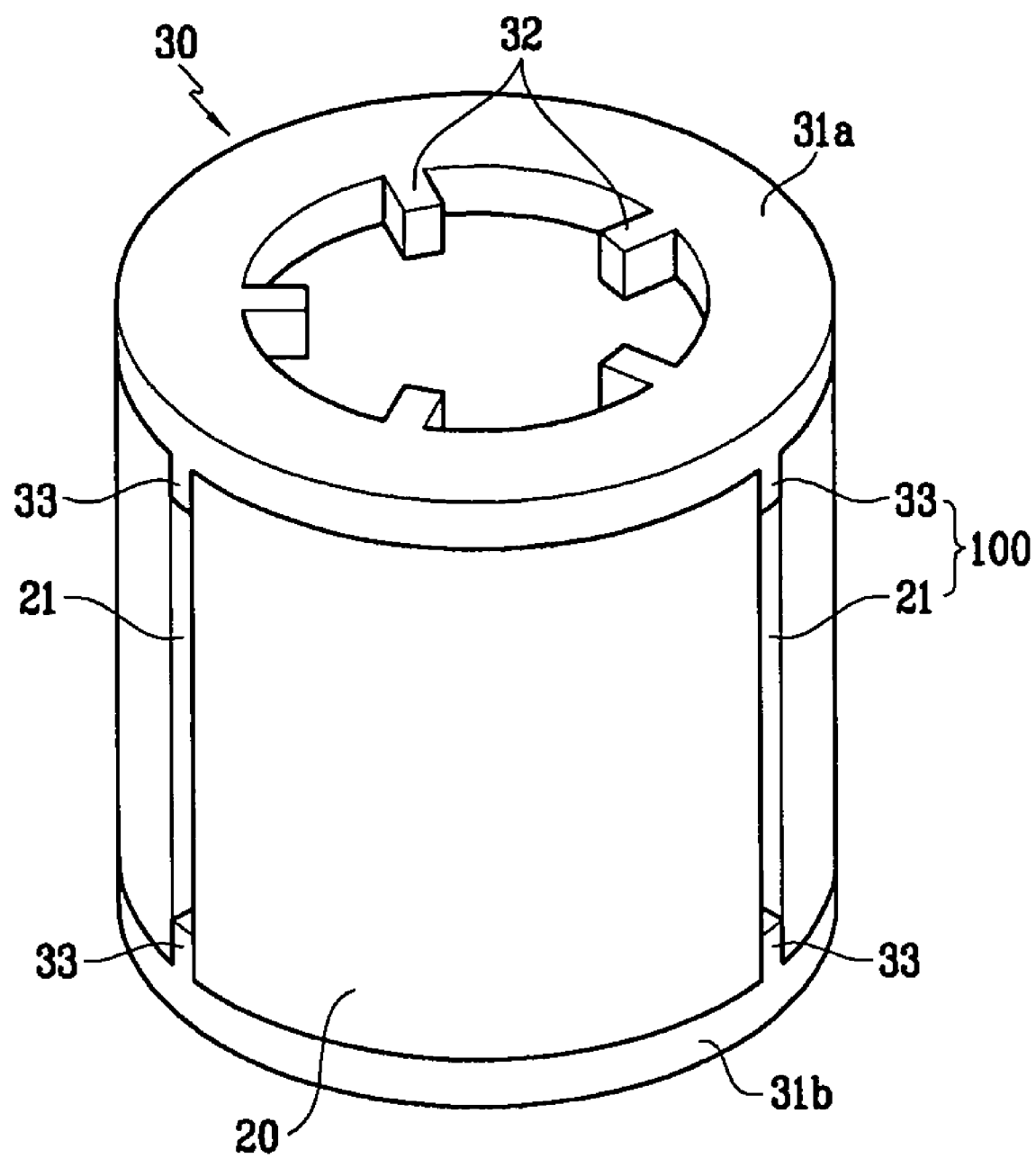
FIG. 5 is perspective view of a BLDC motor having a coupling unit according to an embodiment of the present invention.

Moreover, as shown in FIG. 5, a BLDC motor in an alternative embodiment of the present invention further includes a coupling unit 100 for coupling the armature yoke 20 and assembly members. As an example, as shown in FIG. 5, the coupling unit is provided with male portions 33 each formed at an outer circumferences of the first and second assembly members 31a and 31b, and female portions 21 each formed at an outer circumference of top and bottom portions of the armature yoke 20 in correspondence to the male portions 33. Accordingly the first and second assembly members 31a and 31b are each coupled at top and bottom portions of the armature yoke 20 such that the male portion 33 is inserted into the female portion 21.

In addition, it is preferable that the fist and second assembly members 31a and 31b are formed of an insulating material such that an electrical impediment does not occur in the BLDC motor. Moreover, it is further preferable that the first and second assembly members 31a and 31b are formed of resin and are each molded with the first projections 32 and second projections (not shown) by an injection molding process such that an electrical impediment is not only intercepted but also the manufacturing process is simplified.

Figure 6:
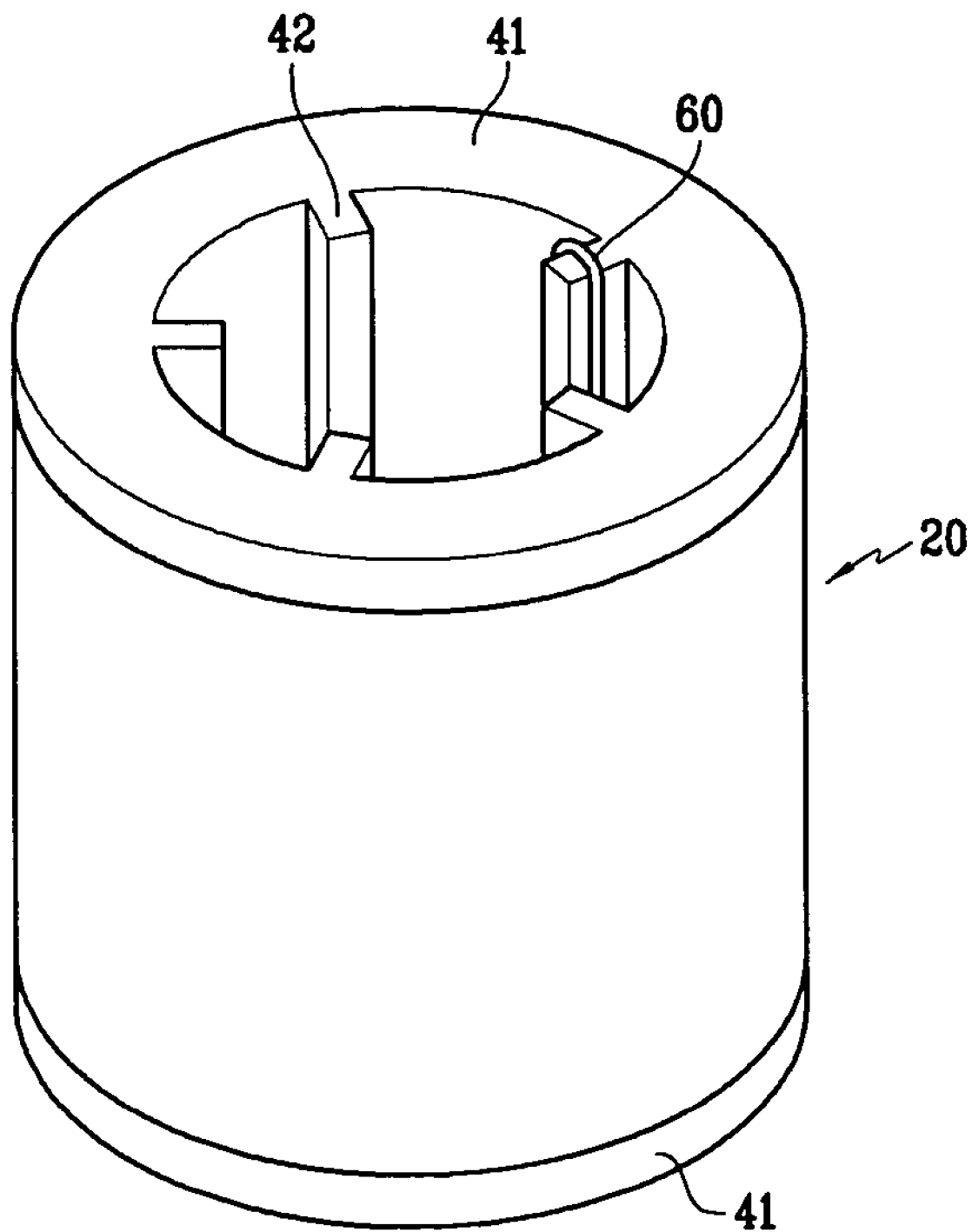
FIG. 6 is perspective view of a BLDC motor according to a second embodiment of the present invention.

A BLDC motor according to the second embodiment of the present invention will hereinafter be described with respect to assembly member 41, since the rotor (see R of FIG. 4) and the stator (see S of FIG. 4) thereof are identical with those of the BLDC motor of the first embodiment. As shown in FIG. 6, a BLDC motor according a second embodiment of the present invention includes assembly member 41 which extends along the entire inner circumference of the armature yoke 20, and has a plurality of projections 42 formed around its inner circumference. Preferably, projections 42 are formed from the top portion to the bottom portion of the assembly member 41 and are each arranged with a predetermined distance therebetween.

Since the projections 42 are formed from the top portion to the bottom portion of the assembly member 41 and are each arranged with a predetermined distance therebetween, the distance between armature coils (see reference number 60 of FIG. 4) can be precisely predetermined. A BLDC motor according to this second embodiment of the present invention thus has an advantage in that a coupling unit (see reference number 100 of FIG. 5) like in the first embodiment is not required, since the assembly member 41 is provided along the inner circumference of the armature yoke 20

Figure 1:
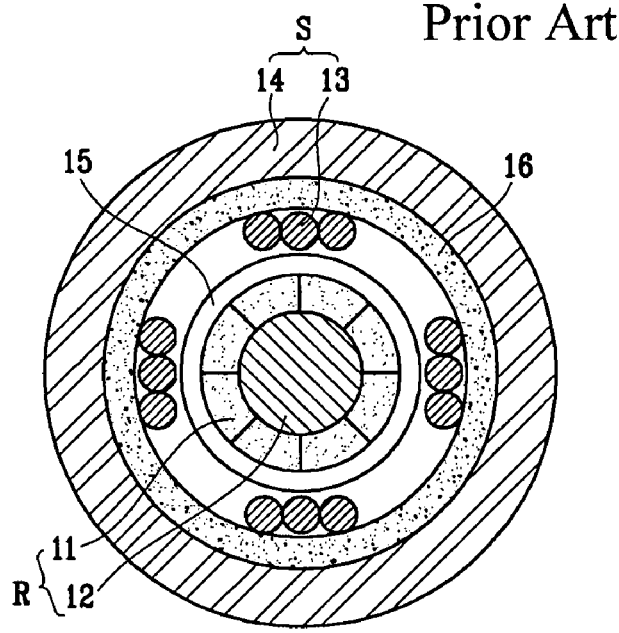
FIG. 1 is a cross-sectional view of a conventional BLDC motor.
Figure 2:
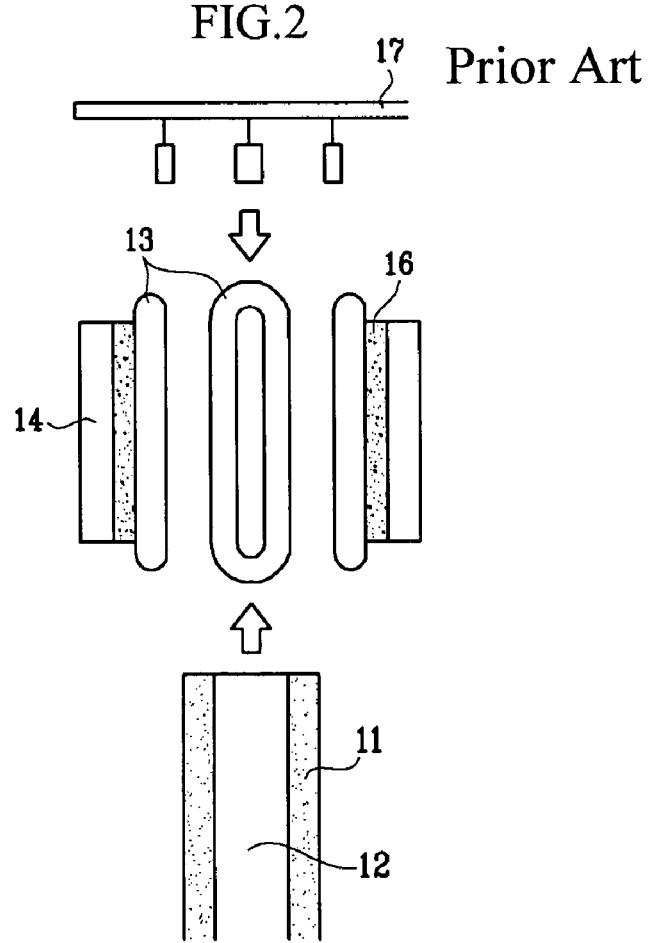
FIG. 2 is a vertical sectional view of an assembly state of a conventional BLDC motor.

In addition, it is preferable that the assembly member 41 is formed of an insulating material such that an electrical impediment is not generated in the BLDC motor. Furthermore, the assembly member 41 can take the place of the non-conductor (see reference number 16 of FIG. 1)

explained in the related art. That is, a BLDC motor according to the present invention has the advantage that a general non-conductor (see reference number 16 of FIG. 1) is not required. Accordingly, a BLDC motor according to the present invention permits a significant saving in component production cost.

It is also preferable that the assembly member 41 be molded on the armature yoke 20 by an epoxy molding process. As another example, it is preferable that the assembly member 41 is formed of resin, and is molded with the third projection 42 by an injection molding process. Particularly, the assembly member 41 can be molded on the armature yoke 20 by a double-shot molding process. Accordingly, output efficiency and definitude can be enhanced since the process of inserting the assembly member into the armature yoke 20 may be omitted.

A BLDC motor according to a third embodiment of the present invention will be hereinafter described with respect to at least one assembly member 50, since the rotor (see R of FIG. 4) and the stator (see S of FIG. 4) thereof are identical with those of the BLDC motor of the first embodiment.

Figure 7:
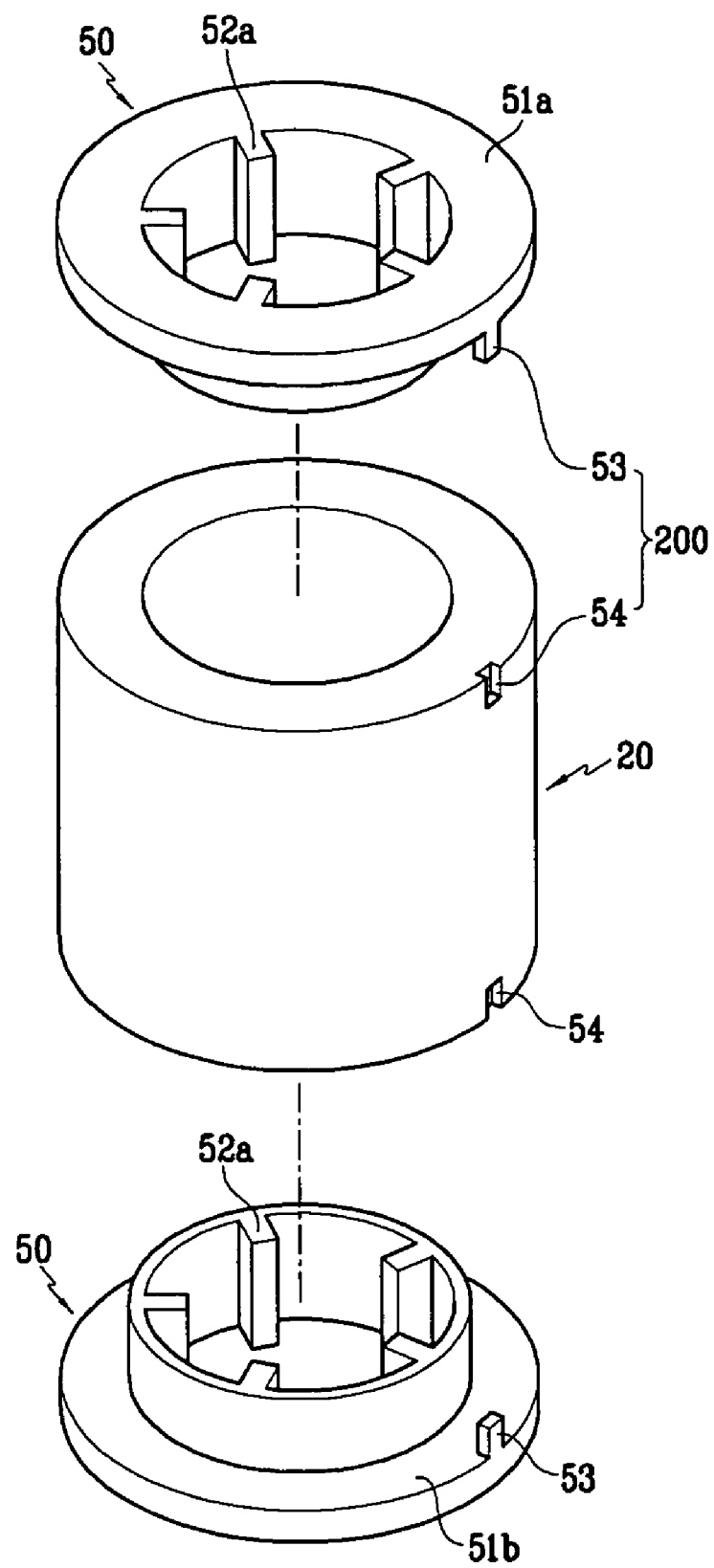
FIG. 7 is perspective view of a BLDC motor according to a third embodiment of the present invention.

As shown in FIG. 7, a BLDC motor according to the third embodiment of the present invention includes at least one assembly member 50, which preferably comprises upper assembly member 51a provided to a top end of the armature yoke 20 such that a bottom portion thereof is inserted into the inner circumference of the armature yoke 20, and a lower assembly member 51b provided to a bottom end of the armature yoke 20 such that a top portion thereof is inserted into the inner circumference of the armature yoke 20.

Upper assembly member 51a has a plurality of projections 52a formed around the inner circumference thereof. Particularly, the projections 52a are each arranged with a predetermined, fixed distance therebetween.

Lower assembly member 51b has a plurality of projections 52b formed around the inner circumference thereof in correspondence to the projections 52a. Particularly, the projections 52b are each arranged with a predetermined distance therebetween. Since projections 52a and 52b are each positioned at top and bottom ends of armature yoke 20 in correspondence to each other, the distance between armature coils (see reference number 60 of FIG. 4) will be maintained as a predetermined distance.

Moreover, a BLDC motor according to this third alternative embodiment of the present invention has an advantage in that a coupling unit (see reference number 100 of FIG. 5) like in the first embodiment is not required, since the assembly members 51a and 51b are inserted into an inner circumference of the armature yoke 20

In addition, it is preferable that the assembly members 51a and 51b are formed of an insulating material such that an electrical impediment does not occur in a BLDC motor. Moreover, it is preferable that the assembly members 51a and 51b are formed of resin, and are each molded with the projections 52a and 52b by an injection molding process.

In addition, as shown in FIG. 7, a BLDC motor according to this embodiment of the present invention further includes a positioning unit 200 such that the projections 52a are positioned in correspondence to the projections 52b. As an example, as shown in FIG. 7, the positioning unit 200 is provided with catch projections 53 each formed at outer circumferences of the assembly members 51a and 51b, and catch grooves 54 each formed at outer circumferences of top and bottom portions of the armature yoke 200 in correspondence to the catch projections 53.

Assembly and service of assembly members of embodiments of the present invention will hereinafter be explained in detail.

Firstly, a first embodiment of the present invention will be explained with reference to FIGS. 3 to 5.

First and second assembly members 31a and 31b are each positioned at top end and bottom ends of the armature yoke 20. Male portions 33 each formed at first and second assembly members 31a and 31b are inserted into female portions 21 formed at the armature yoke 20. The male portions 33 and female portions 21 must be formed at pertinent positions such that the first projections 32 and second projections (not shown) are in correspondence to each other. Then, armature coils (see reference number 60 of FIG. 4) are coupled with the first projections 32 and second projections (not shown).

A second embodiment of the present invention will hereinafter be explained in detail with reference to the FIG. 6.

Assembly member 41 is bonded around the inner circumference of the armature yoke 20 by a double-shot or epoxy molding process, for example. Accordingly, assembly member 41 can also perform the function of a non-conductor (see reference number 16 of FIG. 1) as described in the related art. The double-shot molding process is a method in which the armature yoke 20 is mounted at a tool-set-formed pattern of assembly member 41, and is molded with assembly member 41. Then, armature coils 60 are coupled to projection 42.

A third embodiment of the present invention will hereinafter be explained in detail with reference to FIG. 7.

Upper and lower assembly members 51a and 51b are each inserted at top and bottom portions of the armature yoke 20. The upper and lower projections 52a and 52b are positioned in correspondence to each other by the positioning unit 200. Then, armature coils (see reference number 60 of FIG. 4) are coupled with the projections 52a and 52b.

As has been explained, the BLDC motor according to embodiments of the present invention has a number of advantages. According to embodiments of the present invention, since the assembly member is provided to the BLDC motor, assembly quality of the armature coils can be enhanced. Moreover, since distribution of magnetomotive force is uniform, torque ripple can be decreased, that is, lost torque, vibration, and noise can be decreased. All the advantages described in the specification are inclusive.

While this invention has been described in connection with what is presently considered to be the most practical and preferred embodiment, it is to be understood that the invention is not limited to the disclosed embodiments, but, on the contrary, is intended to cover various modifications and equivalent arrangements included within the spirit and scope of the appended claims.

What is claimed is:

1. A brushless DC (BLDC) motor, comprising:
    a rotor comprising a permanent magnet and a rotor core, for forming a magnetic field;
    a stator comprising an armature coil and an armature yoke, for forming a rotating magnetic field;
    a first assembly member formed of resin and molded by an injection molding process, coupled by a first coupling unit to a top end of the armature yoke; and
    a second assembly member formed of resin and molded by an injection molding process, coupled by a second coupling unit to a bottom end of the armature yoke,
    wherein each of said assembly members comprises a ring shape coaxially provided to the armature yoke, and each of the assembly members comprises a plurality of projections formed at an inner circumference thereof with predetermined distance therebetween,
wherein each of said first and second coupling units comprises:
a male portion formed at the assembly member; and
a female portion formed at the armature yoke.

2. A brushless DC (BLDC) motor, comprising:
a rotor comprising a permanent magnet and a rotor core, for forming a magnetic field;
a stator comprising an armature coil and an armature yoke, for forming a rotating magnetic field;
an upper assembly member of a ring shape, coaxially provided to a top end of the armature yoke such that a bottom portion thereof is inserted into an inner circumference of the armature yoke;
a lower assembly member of a ring shape, coaxially provided to a bottom end of the armature yoke such that a top portion thereof is inserted into an inner circumference of the armature yoke, wherein each of said assembly members comprises a plurality of projections formed at an inner circumference thereof with predetermined distance therebetween, and wherein the upper and lower assembly members are formed of resin and are each molded by an injection molding process; and
a positioning unit such that a projection of the upper assembly member is positioned in correspondence to a projection of the lower assembly member, wherein the positioning unit comprises:
catch projections each formed at the upper and lower assembly members; and
catch grooves formed at the armature yoke in correspondence to the catch projections.

* * * * *